Sept. 20, 1966 P. R. HILL ETAL 3,273,355
HEAT PROTECTION APPARATUS
Filed Dec. 19, 1962 4 Sheets-Sheet 1

INVENTORS
PAUL R. HILL
OTTO F. TROUT, JR.

BY

ATTORNEYS

INVENTORS
PAUL R. HILL
OTTO F. TROUT, JR.

BY

ATTORNEYS

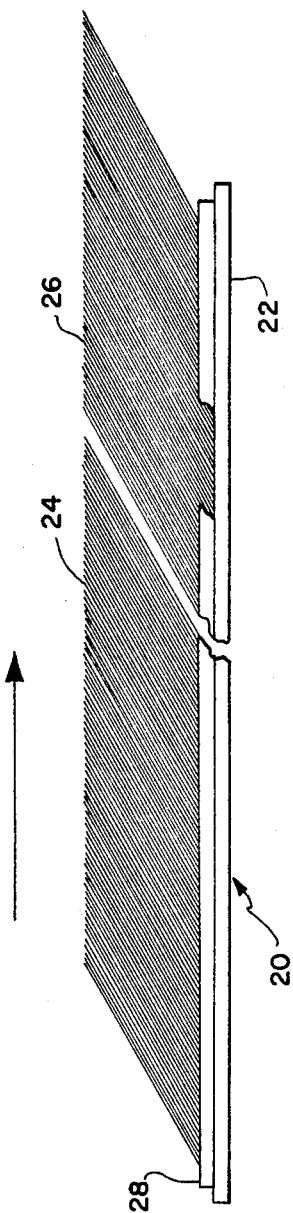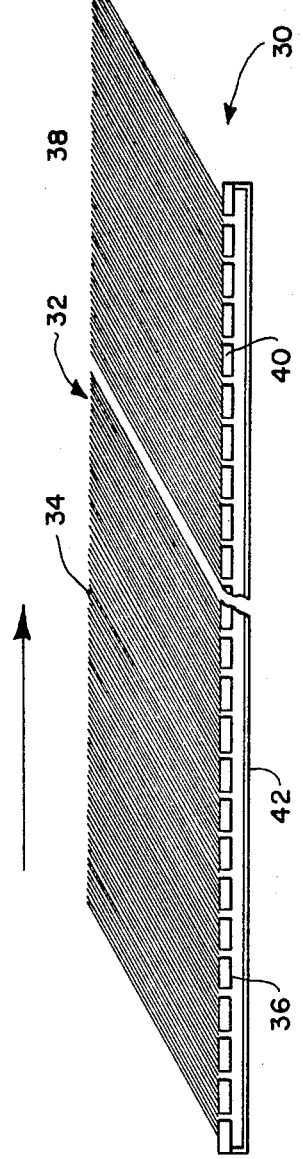

൧
3,273,355
HEAT PROTECTION APPARATUS
Paul R. Hill and Otto F. Trout, Jr., Hampton, Va., assignors to the United States of America as represented by the Administrator of the National Aeronautics and Space Administration
Filed Dec. 19, 1962, Ser. No. 245,941
6 Claims. (Cl. 62—467)

The invention described herein may be manufactured and used by or for the Government of the United States of America for governmental purposes without the payment of any royalties thereon or therefor.

This invention relates generally to an improved thermal protection system for application to the wing, control and other surfaces of hypersonic and other flight and re-entry vehicles and, more particularly, to an improved thermal protection system especially adaptable for use during hypersonic and re-entry flight.

The need for a durable and yet lightweight and thermally efficient heat shield for the improved insulation of hypersonic aircraft and other flight and re-entry vehicles against the aerodynamic heating of hypersonic flight has heretofore constituted a primary problem. One method of solving this problem has involved the use of fibers constructed from various materials to act as the desired insulating shield. In one proposal, fibers made of ceramic or glass material have been utilized. These fiber materials have the inherent characteristics of greater strength, flexibility, and lower thermal conductivities. Moreover, the use of such fibers as an insulating means has proven more effective than was found from the use of the solid material from which the fibers were made. In the past, these glass and ceramic fiber constructions have been randomly packed and with no regard to any specific orientation thereof, or when planned orientation has been used, the latter has been only for the purpose of reinforcing certain plastic materials combined therewith which plastic materials were specifically utilized as ablating surfaces adaptable for use with various re-entry vehicles, for example. Another method proposed involved various solid and foamed ceramics but these have proven brittle and, therefore, relatively easy to crack under high temperatures, and of relatively high densities and thermal conductivities. In addition, various organic materials have been tried but found unsuitable as an insulating means since they decompose at high temperatures.

The previously-mentioned fiber constructions further suffered the inherent characteristic of being relatively unrestrained in position and thus entirely unsuitable for exposure to the dynamic air forces routinely encountered during hypersonic flight. In another development, the previously-mentioned glass or ceramic fibers were impregnated with certain organic plastic materials but this had the disadvantage of relatively high thermal conductivity and decomposed at temperatures above approximately 600° F.

The thermal protection system of the present invention eliminates the hereinbefore discussed disadvantages by incorporating a unique and improved fiber construction insuring that a relatively large amount of heat is radiated away from the fiber construction substructure. This latter result is achieved by means of a fiber oriented pile which may be applied either as a covering element to the entire vehicle surface, or to the surfaces thereof exposed to the greatest amount of aerodynamic heating, the latter normally consisting of the leading edges of the wings and tail surfaces and/or nose surfaces of the vehicle. The aforesaid fiber oriented pile further consists of a plurality of relatively elongated fibers each restrained through individual attachment at the root end thereof at an angle to, or within, a supporting base or substructure element. This individual attachment of the fiber root ends uniquely achieves reduced thermal conductivity thereof. This angle at which each fiber is attached is predetermined and is made relative to the plane of the substructure element to insure that the fibers are oriented in predetermined manner in the direction of the airflow. Thus, each fiber is restrained at the root end thereof to the base or substructure element and terminates in an opposite, free end individually disposed at the same predetermined angle and collectively forming an outer surface oriented in the direction of hypersonic airflow and subjected to aerodynamic heating resulting from such flow. This orientation of the fibers in the direction of the airflow insures substantial radiation away therefrom of the aerodynamic heating to which exposed and, therefore, substantially eliminates or minimizes any penetration of the moving heated air substantially below the outer surface of the fibers. In other words, transfer of heat below the fiber outer surface by convection is practically eliminated with the inventive configuration. To further insure that less heat is transferred below the outer surface to the substructure itself, the inventive fibers are made relatively elongated in nature to effect an even greater conduction path length for the heat to travel from the outside surface to the substructure element through the fibers and thus substantially decreases the thermal conductivity of the inventive pile. Additionally, the oriented relationship of the inventive fibers assures that relatively cool air is trapped between the fibers resulting in substantially reduced heat transfer therebetween by conduction and convection. Further, with the individual ends of the fibers restrained on or in the outer surface of the base or substructure element, the emissivity of said outer surface is increased over that of solid materials of the same solid material, and mass loss from the surface is reduced to a minimum.

An object of the present invention, therefore, is the provision of a fiber constructed pile particularly adaptable as a heat shield during hypersonic flight.

A further object of the invention utilizes a fiber constructed pile oriented relative to the airflow and relatively elongated in form and thus having the effect of providing a longer heat conduction path between the external surface thereof and the supporting substructure.

A still further object of the invention resides in a fiber constructed pile further oriented relative to the airflow to insure that airflow is minimized between the fibers and thereby reduces heat transfer therebetween by conduction and convection.

An additional object of the invention provides a fiber oriented pile having the fiber root ends thereof individually constrained relative to the supporting substructure or external surface to virtually eliminate ablation of the exposed external surface and reduce thermal conductivity thereof.

Another object of the invention provides a heat shield system utilizing fiber materials of greater strength and flexibility and oriented relative to the airflow to facilitate substantial radiation of heat received thereby away from its supporting substructure.

Other objects and advantages of the invention will become apparent from the following description taken in connection with the accompanying drawings, in which like reference characters refer to like parts in the several figures.

FIGURES 1, 1a and 1b, respectively, represent front, plan and end views of a section, partially broken away and schematic in form, of the thermal protection system of the invention, illustrating details of one form of fiber oriented pile utilized therewith.

FIGURE 3 represents a front view of a section similar to FIG. 1, partially broken away and schematic in form, of the inventive thermal protection system, illustrating details of a modified form of fiber oriented pile utilized therewith.

FIGURE 5 is a front view of a section of the inventive thermal protection system of FIGS. 1 and 3, illustrating details of another modified form of fiber oriented pile utilized therewith.

Figure 1A:
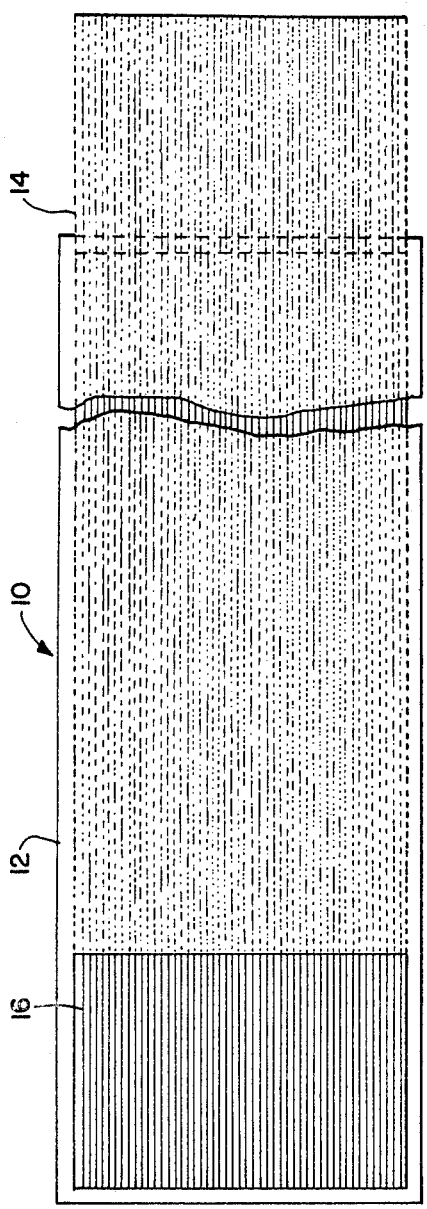
Figure 1:
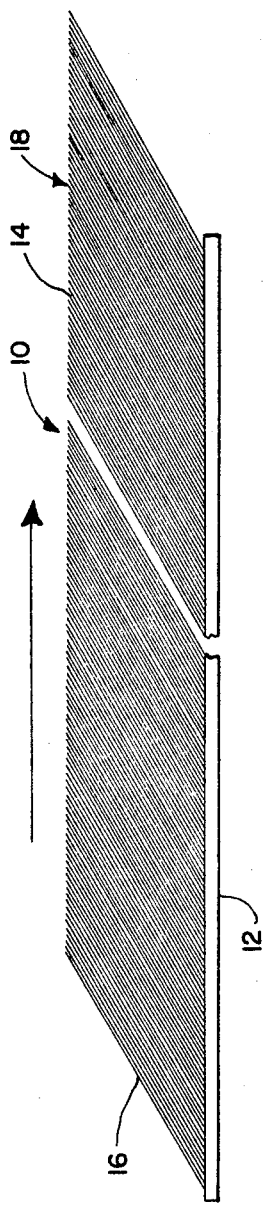
Figure 1B:
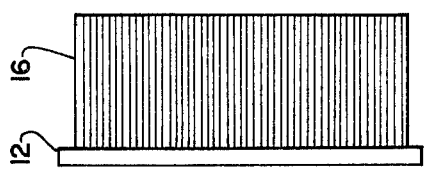

Referring to the drawings and particularly FIGS. 1, 1a and 1b, and FIG. 2 thereof, the improved thermal protection system of the present invention, indicated generally at 10, includes a substructure element 12, which may consist of an epoxy resin cement base element formed on, or as a part of, the upper surface thereof for a purpose to be described in more detail hereinafter. Said system further includes a fiber oriented pile at 14 positioned on said base or substructure element 12 which pile 14 consists of a plurality of fibers 16, constructed of either ceramic or glass material. Fibers 16 are made elongated in form and further extend in a somewhat upright relation (as indicated in FIG. 1, for example) at a predetermined angle to the plane of the surface of the base or substructure element 12 to terminate in a plurality of free fiber upper ends closely spaced relative to each other to collectively form an outside surface indicated generally at 18 which outside surface 18 is exposed to the aerodynamic heating of hypersonic flow. A key feature of this arrangement resides in the specific manner by which fibers 16 are positioned within the base or substructure element 12. Each fiber 16 is individually cast within the epoxy resin cement of said base or substructure element 12 and, as such, assures reduced thermal conductivity therewithin.

Figure 2:
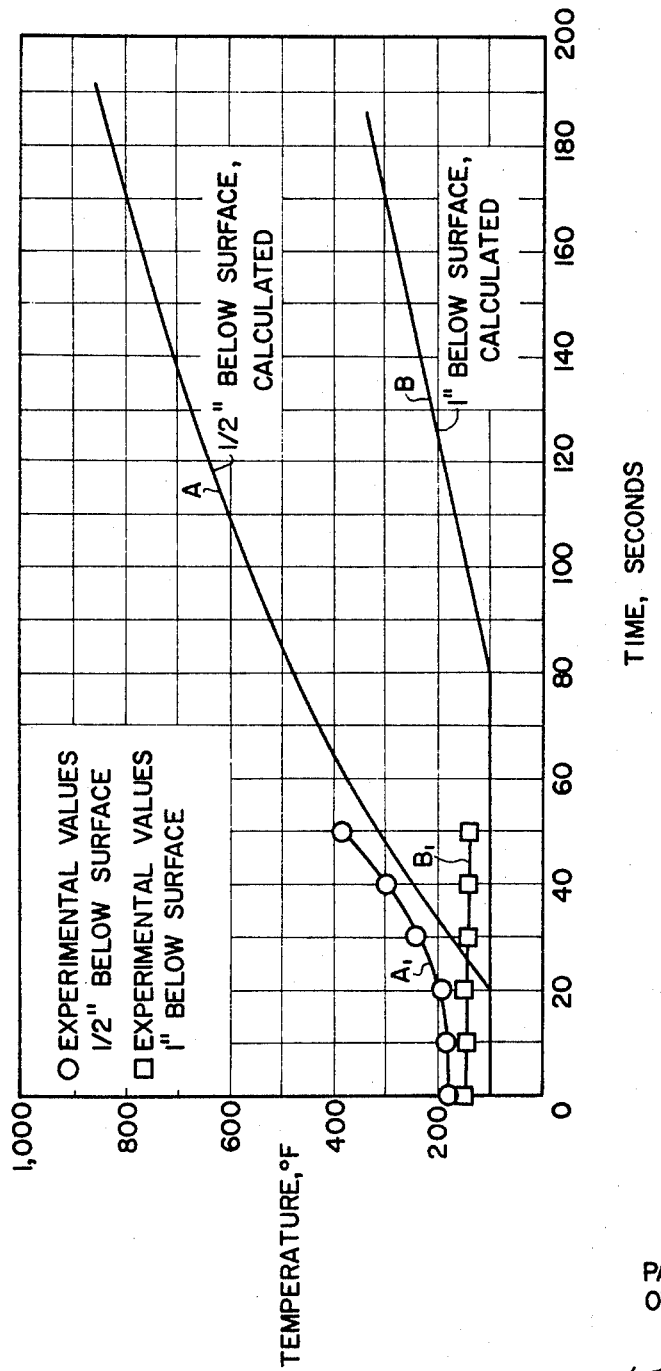
FIGURE 2 represents a time study graph of the inventive thermal protection system of FIG. 1, illustrating temperatures at various depths below the outer surface of the fiber oriented pile utilized therewith.

As viewed particularly in FIG. 1 of the drawings, the plurality of fibers 16 are shown attached or cast within substructure element 12 at the aforesaid predetermined angle to insure the orientation thereof in the direction of the airflow (indicated by the arrow). Thus, with fibers 16 made elongated in form and positioned in oriented relation to the direction of hypersonic flow, a major portion of the aerodynamic heating to which the outside surface 18 thereof is exposed is radiated away therefrom at a rate proportional to the emissivity and the fourth power of the temperature at the surface 18. In other words, the amount of heat so radiated away from outside surface 18 is actually determined to be many times greater than that absorbed through the fiber oriented pile to the substructure element 12 especially when the temperature of the surface 18 is above 1,000° F., or at 2,200° F., for example, as in the case for the time study graph of FIG. 2. In the latter figure, curves A and B, respectively, represent the theoretical or calculated temperatures within the fiber pile itself at depths of one-half and one inch below the outside surface 18 of fibers 16, whereas curves $A_1$, and $B_1$, respectively, represent the experimental or measured values of temperature at the same depths, as determined through the positioning of a plurality of thermocouples within a test sample constructed in accordance with the inventive thermal protection system. Thus, with the modification of FIG. 1, the substructure element 12 is held to a temperature (as shown in FIG. 2) no higher than 700° F. for 140 seconds at a depth of one-half inch below the surface, and no higher than 240° F. at a depth of one inch below the surface for the same 140 second period. Thus it is clear that the thermal protection system of FIG. 1 insures an appreciable amount of heat radiation away from the substructure or base element thereof. Curves $A_1$, and $B_1$, reveal experimental results closely approximating that of calculated curves A and B.

With specific reference to FIG. 3 of the drawings, a modified form of inventive thermal protection system is indicated generally at 20 as including the base or substructure element 22 and the plurality of ceramic or glass fibers indicated generally at 24. The plurality of fibers 24 are oriented in the direction of the airflow (as shown by the arrow) by being attached to or cast within the surface of substructure element 22 at a predetermined angle thereto by means of a layer or upper surface portion composed of any suitable adhesive cement material incorporated in substructure element 22. Further, the plurality of fibers 24 terminate in upper free fiber ends collectively forming the outside surface at 26 identical to the outside surface 18 of the modification of FIG. 1. As in the latter modification, the fibers 24 of the modification of FIG. 3 insure that a substantial proportion of the heat received by the outside surface 26 thereof is radiated away therefrom. To provide further cooling especially at the root ends of the fibers 24, a solid coolant material may be placed in position as indicated at 28 on the upper surface of the base or substructure element 22. This solid coolant may consist of any suitable decomposition material, as for example, ammonium chloride, Teflon or polystyrene which gradually decomposes while absorbing substantial amounts of residue heat, or it may consist of a suitable vaporizable material utilized for this purpose. In either event, this material may be packed in solid form on the upper surface of the substructure element 22 in surrounding relation to the root ends of fibers 24, or it may be initially applied in solid form and subsequently melted in position to achieve better adherence thereof to the fiber root ends, or it may be initially applied as a liquid and subsequently polymerized into a solid form in position on the outer surface of the substructure element 22 without departing from the true spirit or scope of the invention. Thus, the aforesaid solid coolant material effects cooling primarily through a process of either decomposition or vaporization, as appropriate for the particular material. The amount of additional cooling provided at the root ends of fibers 24, in this manner, is substantial when considered in the light of the major portion of heat already radiated away from the outside surface 26 as compared to the minor portion or residue of heat actually conducted to the root ends of the fibers 24. Of course, the additional root cooling substantially increases the amount of time to which the outside surface 26 may be exposed to excessive heating. Thus, the inventive thermal protective system, hereinbefore described with reference to the modifications of both FIGS. 1 and 3, insures an improved and yet simplified heat protection means adaptable for use with hypersonic aircraft and other flight and re-entry vehicles especially during hypersonic flight and re-entry.

Figure 4:
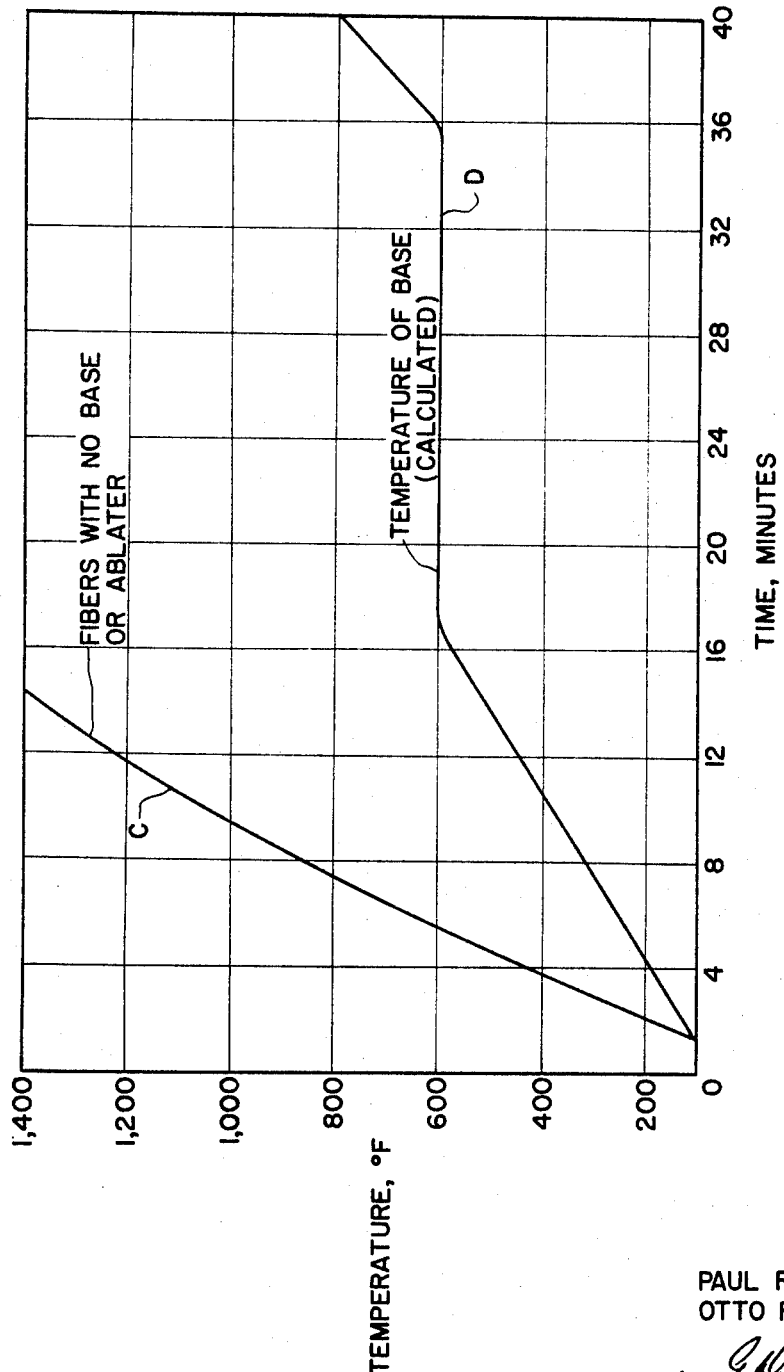
FIGURE 4 represents a second time study graph wherein the effect of decomposition material utilized with the modified thermal protection system of FIG. 3 is illustrated.

Referring specifically to FIG. 4 of the drawings, curves C and D, respectively, illustrate the theoretical heat shield effect of the use of fibers alone and the use of fibers coupled with the base and decomposition material added thereto as in FIG. 3. The temperature of the outside surface of the fibers is held at 2,200° F. A comparison of curve C with curve D reveals that, on the one hand, with fibers alone, approximately 6 minutes elapses before the root temperature elevates to approximately 600° F. On the other hand, with base and decomposition material added, approximately 16 minutes elapses before approximately the same temperature of 600° F. is attained. More importantly, with the latter arrangement, the base or substructure element is maintained approximately at the 600° F. level for an additional period of approximately 18 minutes while decomposition occurs. Thus, with the use, for example, of a one inch thick fiber pile having a fiber density of 1.5 pounds per square foot and with the outer surface thereof exposed to a temperature of approximately 2,200° F., an elapsed time of exposure of approximately 36 minutes can be anticipated before the temperature of the base or substructure element rises to 700° F., the specified design limit.

Referring particularly to FIG. 5 of the drawings, the thermal protection system of the invention is shown further modified to provide an alternate root cooling means. The system is illustrated generally at 30 as including the fiber oriented pile 32 which is similar to that of FIGS. 1 and 3 in that it also incorporates the plurality of ceramic or glass fibers indicated at 34 which fibers are likewise individually attached or cast at the fiber root ends thereof in an epoxy cement or other suitable adhesive surface formed in the base or substructure element 36. Said fibers 34 further extend upwardly to outer free fiber ends collectively forming an outside surface at 38 (identical to the outside surfaces 18 and 26, respectively, of FIGS. 1 and 3). As in the hereinbefore described modifications of FIGS. 1 and 3, a major portion of the aerodynamic heating is radiated away from the outside surface 38 through the combination of the oriented relation of fibers 34 relative to the direction of airflow and the elongated nature thereof. A further improved root cooling means is provided to effect vaporization at the fiber root ends, as when a liquid coolant is used, or other cooling is effected, as when a gas coolant is used. Naturally, this additional cooling of the fiber root ends further extends the time of operation of the inventive system. More particularly, the aforesaid additional cooling of the root ends of the fibers 34 results from the further modification of the fiber oriented pile 32 to incorporate therein a plurality of individual and spaced cooling passages indicated generally at 40 as constructed as an integral part of, and in substantially depending relation to, the substructure element 36. Furthermore, an enclosing coolant distribution chamber is provided at 42 for supplying and distributing coolant to the plurality of cooling passages 40. Said coolant distribution chamber 42 may constitute either an integral portion of substructure element 36, or it may consist of a separate element mounted, as shown, in depending relation to said substructure element 36, without departing from the true spirit or scope of the invention. In either event, the coolant distribution chamber 42 is positioned in enclosed relation relative to substructure element 42 and in open communication with the plurality of cooling passages 40 to provide the necessary coolant flow thereinto. With this latter modification, the inventive thermal protection system 30 may be subjected to even higher temperatures and/or operated for longer periods before the temperature of the substructure element 36 reaches its design limit. In fact, the amount of elapsed time during which the inventive system may be exposed to excessive temperatures is dependent primarily on the mass of coolant available.

The thermal protection system of the present invention offers the advantage of heat radiation away from the surfaces of the hypersonic and other flight or re-entry vehicles at a relatively large rate as compared to that actually absorbed into the substructure itself. With the present system, the proportional amount of heat radiated away from the inner surface is much greater than for other heat protection systems of comparable weight. Moreover, the improved root cooling systems of the present invention, illustrated in the modifications of FIGS. 3 and 5, provide even better thermal protection and, as such, effect even lower thermal conductivities than is already inherent in the inventive thermal protection system as disclosed in FIG. 1. Finally, the inventive fiber oriented pile, being direction oriented and composed of relatively elongated fibers of either glass or ceramic material, affords improved heat insulation and thermal conductivity, as well as increased strength and flexibility, and prevents a substantial portion of heated air from penetrating below the outer surface thereof to the substructure element.

What is claimed as new and desired to be secured by Letters Patent of the United States is:

1. A thermal protection device for cooling the external surfaces of hypersonic aircraft and other flight and re-entry vehicles during hypersonic flight comprising: a lower heat shield consisting of a supporting substructure element adaptable as an integral part of the external surfaces of hypersonic aircraft and other flight and re-entry vehicles; a plurality of low thermal conductive fibers cast within the upper surface of the substructure element at the inner, root ends thereof and at an angle thereto insuring orientation of the upper fiber ends thereof in the direction of the air-flow and constituting an upper heat shield; and root cooling means incorporated as an integral part of the lower heat shield to provide additional cooling thereto.

2. A thermal protection device for cooling the external surfaces of hypersonic aircraft and other flight and re-entry vehicles as in claim 1, said root cooling means comprising: a plurality of coolant passages incorporated within the supporting substructure element in depending relation to the upper surface thereof; and a coolant supply chamber enclosing said substructure element and in open communication with the plurality of cooling passages to supply and distribute coolant thereinto.

3. Improved thermal protection means for shielding the external surfaces of hypersonic aircraft and other flight and re-entry vehicles from excessive aerodynamic heating resulting from exposure to hypersonic airflow comprising: a lower heat shield adaptable for use on the external surfaces of hypersonic aircraft and other flight re-entry vehicles and constituting a substructure element incorporating a lower fiber-end retaining adherent surface on the upper surface thereof; an upper heat shield affixed on the upper adherent surface of said substructure element consisting of a plurality of relatively elongated fibers individually fixed at the lower fiber root ends thereof at a direction-oriented relation to the direction of hypersonic flow within the upper adherent surface of the substructure element to insure relatively low thermal conductivity relative to heat transfer between the upper heat shield and the substructure element and extending upwardly therefrom in the direction oriented relation to terminate in a plurality of free fiber upper end portions forming the outermost surface of the upper heat shield exposed to aerodynamic heating; and solid root cooling means formed on the upper surface of the substructure element in association with the root ends of the plurality of fibers and providing additional cooling of the fiber root ends through vaporization thereof.

4. Improved thermal protection means as in claim 3, said root cooling means consisting of a solid, coolant material decomposable at a specified minimum temperature to maintain the substructure element and fiber root ends at a substantially constant, relatively low temperature value between predetermined limits during decomposition of the solid coolant material.

5. An improved thermal protection means as in claim 3, the relatively elongated fibers being of low thermal conductive material to further insure low thermal conductivity relative to heat transfer between the upper heat shield and the substructure element.

6. A thermal protection device for cooling the lifting and other surfaces of hypersonic aircraft and other flight and re-entry vehicles exposed to aerodynamic heating during hypersonic flight comprising: a support element; a fiber oriented pile consisting of a plurality of heat radiating elements individually attached at the inner side thereof to said support element and incorporating an outer surface consisting of the outer ends of the plurality of heat radiating elements predeterminately oriented in the direction of hypersonic airflow to effect thermal radiation away therefrom of the aerodynamic heat resulting from the hypersonic airflow; root cooling means incorporated on the support element adjacent the attachment thereto of the lower heat radiating element ends to provide additional cooling to the residue of heat conducted thereto after the major portion of heat has been radiated away therefrom by the oriented relation of the outer surface; said root cooling means having a plurality of relatively elongated cooling passages extending across and in depending relation to the support element; and coolant supply means in communication with the cooling passages to supply the coolant thereto.

References Cited by the Examiner

UNITED STATES PATENTS

| | | | |
|---|---|---|---|
| 2,001,970 | 5/1935 | Mazer | 161—67 X |
| 2,077,262 | 4/1937 | Prudden | 154—44.51 |
| 2,131,404 | 9/1938 | Long | 165—185 X |
| 2,184,908 | 12/1939 | Chan | 165—185 X |
| 2,282,923 | 5/1942 | Armbruster | 165—107 X |
| 2,327,786 | 8/1943 | Heintz | 165—104 X |
| 2,833,524 | 5/1958 | Wolf | 165—185 X |
| 2,947,152 | 8/1960 | Bloem | 165—135 X |
| 3,014,353 | 12/1961 | Scully et al. | 62—467 |
| 3,015,461 | 1/1962 | Fineblum | 244—117.1 |
| 3,081,705 | 3/1963 | Warnken | 102—92.5 |
| 3,179,550 | 4/1965 | Friedman | 161—62 |
| 3,200,750 | 8/1965 | Burrows | 102—92.5 |

ROBERT A. O'LEARY, *Primary Examiner.*

M. SUSSMAN, CHARLES SUKALO, *Examiners.*

FREDERICK L. MATTESON, JR., A. W. DAVIS,
*Assistant Examiners.*